United States Patent [19]
Takeuchi et al.

[11] Patent Number: 4,720,630
[45] Date of Patent: Jan. 19, 1988

[54] ACTIVE OPTICAL CONNECTOR INCLUDING AN ELECTRONIC CIRCUIT BOARD AND AN OPTICAL FIBER

[75] Inventors: Tamio Takeuchi, Yokohama; Yasumasa Koakutsu, Fujisawa; Junichi Shimizu, Tokyo; Masao Yano; Minoru Ikenoue, both of Yokohama; Seiichi Onoda, Tokorozawa, all of Japan

[73] Assignee: Hitachi, Ltd., Tokyo, Japan

[21] Appl. No.: 848,275

[22] Filed: Apr. 4, 1986

[30] Foreign Application Priority Data

Apr. 5, 1985 [JP] Japan ................................. 60-70871
Oct. 23, 1985 [JP] Japan ................................ 60-235215

[51] Int. Cl.⁴ ........................... H01J 5/16; H01J 40/14
[52] U.S. Cl. ..................................... 250/227; 455/612
[58] Field of Search ...................... 250/227; 350/96.2; 235/472; 455/610, 612

[56] References Cited
U.S. PATENT DOCUMENTS

| | | | |
|---|---|---|---|
| 3,509,353 | 4/1970 | Sundblad et al. | 250/227 |
| 3,727,030 | 4/1973 | McMurtry | 235/472 |
| 3,735,142 | 5/1973 | Harr et al. | 235/472 |
| 3,758,782 | 9/1973 | Radford et al. | 250/227 |
| 3,809,908 | 5/1974 | Clanton | 250/227 |
| 3,892,974 | 7/1975 | Ellefson et al. | 235/472 |
| 3,911,270 | 10/1975 | Traub | 250/227 |
| 4,346,294 | 8/1982 | Albaugh et al. | 250/227 |
| 4,568,145 | 2/1986 | Colin et al. | 350/96.2 |

OTHER PUBLICATIONS

McMurty, "Hand Probe for Optical Scanning System", 2/72, IBM Technical Disclosure Bulletin, vol. 14, No. 9, pp. 2848-2849.

*Primary Examiner*—David C. Nelms
*Assistant Examiner*—William L. Oen
*Attorney, Agent, or Firm*—Antonelli, Terry & Wands

[57] ABSTRACT

An opto-electric transformation connector is provided, which can be used, as if it were an electric connector, without consideration of optical transmission of devices connected therewith, in a connecting system for connecting different devices by means of optical fibers. The connector includes an electronic circuit board, on which not only a light emitting element for transmitting optical signals and a light receiving element for receiving optical signals are disposed, but also a driving circuit for driving the light emitting element and an amplifier circuit for amplifying the light signals received by the light receiving element are mounted.

8 Claims, 9 Drawing Figures

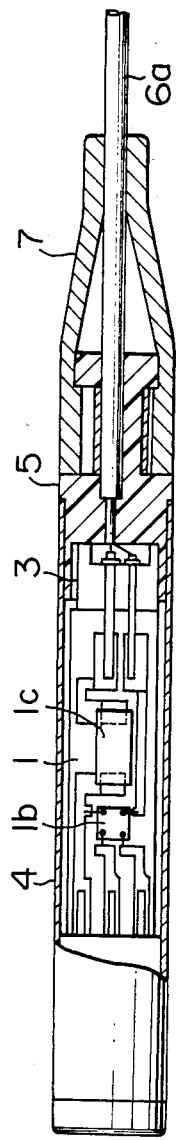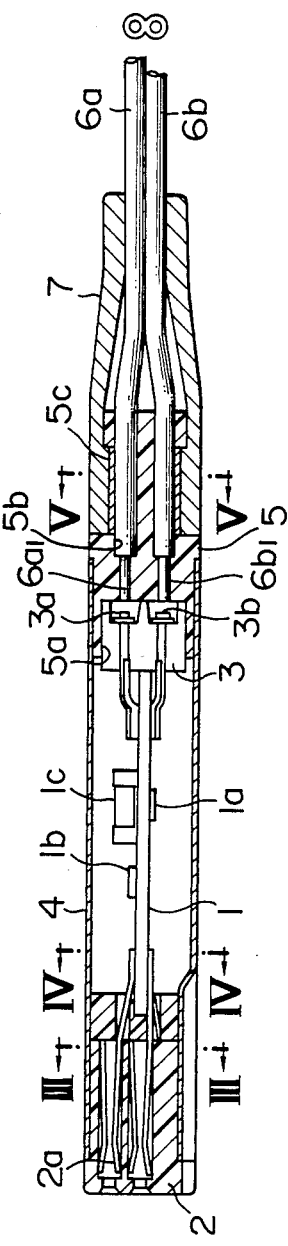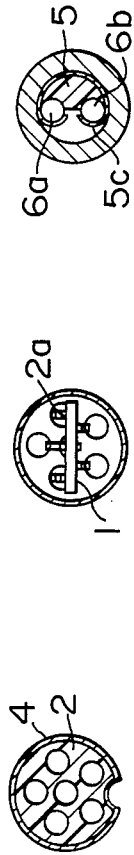

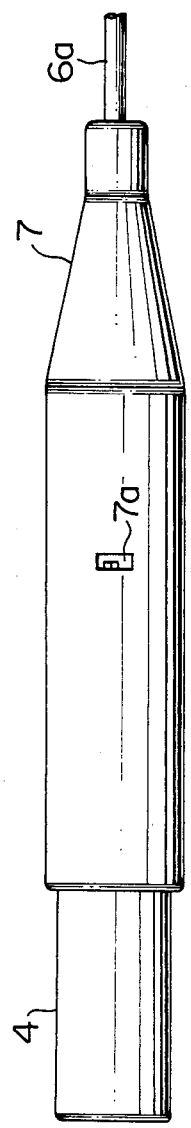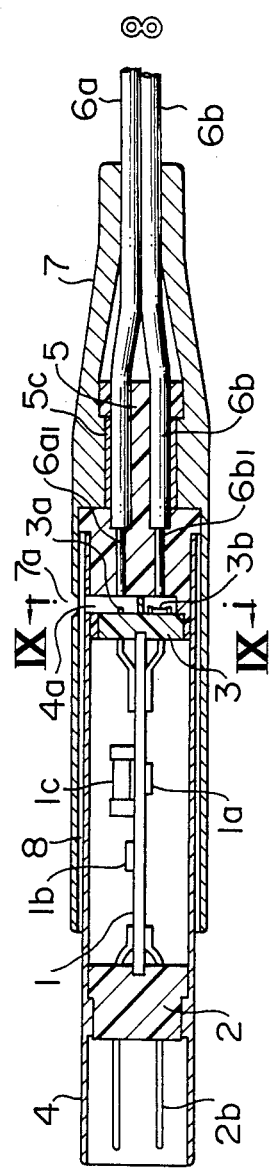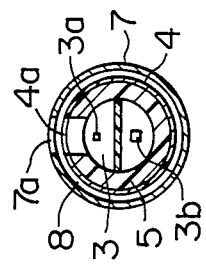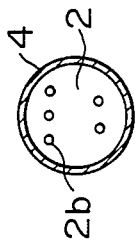

ACTIVE OPTICAL CONNECTOR INCLUDING AN ELECTRONIC CIRCUIT BOARD AND AN OPTICAL FIBER

BACKGROUND OF THE INVENTION

This invention relates to an active optical connector incorporating a light transmission module, whose transmission line is constituted by optical fibers.

An opto-electrical connection system using an optical fiber as a transmission line has an advantage that it is hardly influenced by noise interference.

In such a system electric signals are transformed at first into optical output signals by means of a light emitting element coupled to a first electric connection device and the optical signals thus obtained by transformation are transmitted through the optical fibers to a light receiving element in a second connection device, in which they are transformed again into electric signals.

U.S. Pat. No. 3,809,908 discloses an electro-optical transmission line used in the system stated above. According to this reference, connecting means mounted at the two extremities of a transmission line including optical fibers are used substantially as electric connectors, by which a light emitting element and a contact terminal connected electrically with the light emitting element are mounted at one end of an optical fiber, and a light receiving element and a contact terminal connected electrically with the light receiving element are mounted on the other end of the optical fiber.

However, although according to this prior art, the optical fiber can be considered practically as an electric part owing to the contact terminals mounted at the two extremities of the line, for the following technical reasons it cannot be said that it is a perfect electric part. That is, a driving circuit is necessary for driving the light emitting element and an amplifier circuit is required in order to utilize weak electric signals coming from the light emitting element as output signals.

Heretofore, such a driving circuit and an amplifier circuit are disposed at the main part of an apparatus connected with the contact terminal stated above. In the case where the manufacturer of the device, in which the contact terminal and the optical fiber are combined, is different from the user (maker of the main part of the apparatus), which uses the combined device, it necessitates special consideration by which attention should be paid to optical signals in the design of the main part of the apparatus such that a circuit for processing the optical signals should be disposed at the main part side of the apparatus. Consequently, it cannot be said that the prior art electro-optical transmission line described above is a perfect electric part.

SUMMARY OF THE INVENTION

An object of the invention is to provide an optical active connector, which can be used, as if it were an electric connector, without consideration of optical transmission, by combining an optical connector with an optical transmission module including a driving circuit and an amplifier circuit.

Another object of the invention is to provide an optical active connector, which is of small size and easy to be mounted.

Still another object of the invention is to provide an optical active connector permitting to observe light emitted by a light emitting element from the outside in order to confirm or watch the working state of the light emitting element.

According to the present invention an electronic circuit board, on which not only a light emitting element and a light receiving element but also a driving circuit for the light emitting element and an amplifier circuit for the light receiving element are mounted, is installed in each of the connector means mounted at the two extremities of optical fibers, and input/output electric terminals are taken out from the electric circuit board.

BRIEF DESCRIPTION OF THE DRAWINGS

FIG. 1 is a transversal cross-sectional view of a first embodiment of the active connector incorporating an optical transmission module according to this invention;

FIG. 2 is longitudinal cross-sectional view of the connector indicated in FIG. 1 through a section perpendicular to that of FIG. 1;

FIG. 3 is a cross-sectional view along the line III—III in FIG. 2;

FIG. 4 is a cross-sectional view along the line IV—IV in FIG. 2;

FIG. 5 is a cross-sectional view along the line V—V in FIG. 2;

FIG. 6 is plan view of a second embodiment of the active connector according to this invention;

FIG. 7 is a longitudinal cross-sectional view of the connector indicated in FIG. 6;

FIG. 8 is a side view of the connector indicated in FIG. 7, seen from the left; and FIG. 9 is a cross-sectional view along the line IX—IX in FIG. 7.

DESCRIPTION OF THE PREFERRED EMBODIMENTS

Hereinbelow, the first embodiment of this invention will be explained in detail, referring to FIGS. 1 to 5.

FIGS. 1 and 2 show only the left side of a optical fiber cable 6, but on the right side it has another active connector, which makes a pair with that indicated in the figures. Here, "make a pair" means that light signals emitted by a light emitting element 3a indicated in FIG. 2 are received through an optical fiber cable 6a by a light receiving element of the active connector on the right side, which is not indicated in the figures and that light signals emitted by a light emitting element of the active connector on the right side, which is not indicated in the figures are received through an optical fiber cable 6b by a light receiving element 3b indicated in FIG. 2. Since the inner structures of the active connectors can be considered to be identical, in the following explanation only the active connector on the left side will be explained.

In FIGS. 1 and 2, the reference numeral 1 indicates an electronic circuit board mounted in the connector according to this invention, on the surfaces of which circuit patterns are disposed and a receiver IC 1a, where an amplifier circuit, etc. are integrated, a transmitter IC 1b, where a driving circuit, etc. are integrated, and electronic parts, such as a resistor 1c, are mounted. Further, a terminal block 2 having electric terminals 2a is arranged on the left side of the electronic circuit board 1.

Further, the reference numeral 3 indicates a ceramic stem, on which a light emitting element 31a and a light receiving element 3b are mounted and a reference numeral 4 represents a cylindrical case surrounding the electronic circuit board 1, the terminal block 2 for the electric terminals 2a and the stem 3. Reference numeral 5 indicates a fiber holder having a guiding part 5a for guiding the outer surface of the stem 3 with a high precision and a guide hole 5b for opposing the optical fiber cables 61a and 6b to the light emitting element 3a and the light receiving element 3b, respectively, with a high precision. A reference numeral 5c is a caulking ring for fixing the optical fiber cables 6a and 6b to the fiber holder 5. A reference numeral 7 is a protecting cover for protecting the optical fiber cables 6a and 6b.

Now, the assembling method for the first embodiment of this invention described above will be explained below. At first, the electric terminals 2a for sending and receiving electric signals, mounted in the terminal block 2 are connected by soldering, etc. to one end of the electronic circuit board 1, on which electronic parts, such as a receiving IC 1a, a transmitting IC 1b, a resistor 1c, etc., are mounted. Then, the ceramic stem 3, on which the light emitting element 3a and the light receiving element 3b are mounted, is connected by soldering, etc. to the other end of the electronic circuit board 1 stated above. Thereafter, the electronic circuit board 1 connected with the electric terminals 2a and the stem 3 is inserted in the cylindrical case 4 and the terminal block 2 and the cylindrical case 4 are fixed to each other by caulking, adhesion, etc.

On the other hand, after having inserted the optical fiber cables 6a and 6b in the guide hole 5b of the fiber holder 5 and fixed them by means of the caulking ring 5c, the fiber holder 5 is inserted in the cylinder case 4 from the right side and the fiber holder 5 and the cylindrical case 4 are fixed to each other by caulking, adhesion, etc. Here, reference numerals 6a₁ and 6b₁ indicate core wires of the optical fiber cables and their predetermined positional relation for the two optical paths, by which the light emitting element 3a and the light receiving element 3b are opposed to the optical fiber cables 6a and 6b, respectively, can be obtained, because they are relatively well positioned through the guiding portion 5a and the guide hole 5b of the fiber holder 5. Then, the protecting cover 7 for protecting the optical fiber cables 6a, 6b is mounted. In this way, it is possible to obtain an optical active connector, which has a small size ($\phi = 6-8$ mm) and can be used without consideration of optical transmission, owing to the fact that the terminal block 2 for the electric terminals, the electronic circuit board 1, the stem 3 on which the optical elements are mounted, and the fiber holder 5 to which the optical fiber cables 6 are secured are disposed on a straight line in the cylindrical case 4 in one united body.

In addition, although the electric terminals 2a indicated in FIG. 2 are pins disposed in a hole formed in the terminal portion, as indicated in FIG. 3, so-called female pins, it is obvious that they can be rod-shaped male pins. In this case, the whole electric terminal can be formed by molding resin with a plurality of male pins so that the two extremities of the male pins protrude outside of the resin and by connecting one of the extremities to the electronic circuit board 1 by soldering, the other of the extremities being the electric terminals connected with the main part of an electronic apparatus.

FIG. 4 shows the positional relation between the board 1 and the electric terminals 2a and indicates that the electric terminals 2a are soldered on both the surfaces of the board 1. Further, although, in FIGS. 1 and 2, the protecting cover 7 covers only a part of the fiber holder 5, it can be more extended so that it covers the fiber holder 5 up to the neighborhood of the left end of the cylindrical case 4 within the limits where the connector can be connected to the main part of the apparatus without hindrance.

FIGS. 6 through 9 illustrate a second embodiment of this invention, in which the male pins described above are denoted by 2b and the protection cover 7 is extended to the left beyond the right end of the cylindrical case 4. In these figures, the corresponding constituent elements are represented by the same reference numerals as those used for the first embodiment.

The feature of the second embodiment resides in the fact that light emitted by the light emitting element 3a can be observed from the outside of the active connector to confirm the working state of the light emitting element 3a. Consequently, in FIG. 7, the following improvements are effected over the light emitting element 3a. First, the stem 3 and the fiber holder 5 are partly cut-off. Secondly, windows 4a and 7a are formed in the cylindrical case 4 and the protecting cover 7, respectively. Thirdly, a transparent cover 8 is inserted between the cylindrical case 4 and the protecting cover 7.

According to the second embodiment, since excessive light emitted by the light emitting element 3a, which is not received by the optical fiber 6a, can be viewed from the outside through the two windows 4a and 7a formed in the cylindrical case 4 and the protecting cover 7, when a defect is produced, it is easily judged which is defective, the main part of the apparatus or the active connector.

Further, since the light coupling efficiency between the light emitting element 3a and the optical fiber 6a is usually several % and more than about 90% of the emitted light is radiated uselessly, the radiated light is easily observed without using any appreciable driving electric power source.

As explained above in detail, by using the active connector according to this invention, it is possible to obtain an effect that restriction in the design of light transmission module on the side of the main part of the apparatus is relaxed and that the connector can be manipulated, as if it were an electric connector without consideration of the light transmission, because the driving circuit and the amplifier circuit for the optical elements are incorporated in the optical connector. Further, it is advantageous that it can be miniaturized and more easily assembled.

We claim:

1. An optical active connector comprising:
   an optical fiber constituting a signal transmission line between a plurality of outside electrical devices and having end portions held by a fiber holder;
   an electronic circuit board, on which a circuit pattern is formed and circuit elements for optical elements are mounted;
   a terminal block having electric terminals, electrically connected to said electronic circuit board;
   a light emitting element and a light receiving element electrically connected to said electronic circuit board and optically coupled to said optical fiber; and
   a case accommodating said electronic circuit board, said terminal block, said light emitting element, said light receiving element and said fiber holder.

2. An optical active connector according to claim 1, wherein said circuit elements are mounted on both surfaces of said electronic circuit board.

3. An optical active connector according to claim 1, wherein said optical fibers are secured on said fiber holder by means of a caulking ring.

4. An optical active connector according to claim 1, wherein at least a part of the optical fibers and a part of the fiber holder are covered by a protective cover.

5. An optical active connector comprising:
an optical fiber constituting a signal transmission line between a plurality of outside electrical devices and having end portions held by a fiber holder;
an electronic circuit board, on which a circuit pattern is formed and circuit elements for optical elements are mounted;
a terminal block having electric terminals, electrically connected to said electronic circuit board;
a light emitting element and a light receiving element electrically connected to said electronic circuit board and optically coupled to said optical fiber; and
a case accommodating said electronic circuit board, said terminal block, said light emitting element, said light receiving element and said fiber holder, said case being provided with a window in a part accommodating said light emitting element.

6. An optical active connector according to claim 5, wherein said circuit elements are mounted on both surfaces of said electronic circuit board.

7. An optical active connector according to Claim 5, wherein said optical fibers are secured on said fiber holder by means of a caulking ring.

8. An optical active connector comprising:
an optical fiber constituting a signal transmission line between a plurality of outside electrical devices and having end portions held by a fiber holder;
an electronic circuit board, on which a circuit pattern is formed and circuit elements for optical elements are mounted;
a terminal block having electric terminals, electrically connected to said electronic circuit board;
a light emitting element and a light receiving element electrically connected to said electronic circuit board and optically coupled to said optical fiber;
a case accommodating said electronic circuit board, said terminal block, said light emitting element, said light receiving element and said fiber holder, said base being provided with a window in a part accommodating said light emitting element;
a protective cover covering a part of the optical fibers, said fiber holder and a part of the case, and being provided with a window in a part corresponding to said window in said case; and
a transparent cover inserted between said protecting over and said case.

* * * * *